(12) United States Patent
Itoo et al.

(10) Patent No.: US 10,913,459 B2
(45) Date of Patent: Feb. 9, 2021

(54) SHIFT SWITCHING MECHANISM OF UTILITY VEHICLE

(71) Applicant: KAWASAKI JUKOGYO KABUSHIKI KAISHA, Hyogo (JP)

(72) Inventors: Seiji Itoo, Hyogo (JP); Ayumi Hamada, Hyogo (JP); Manabu Hidaka, Hyogo (JP); Masahiko Nakagawa, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 35 days.

(21) Appl. No.: 16/205,626

(22) Filed: Nov. 30, 2018

(65) Prior Publication Data

US 2020/0172107 A1    Jun. 4, 2020

(51) Int. Cl.
| | | |
|---|---|---|
| *F16H 3/091* | (2006.01) | |
| *B60W 30/19* | (2012.01) | |
| *B60W 10/06* | (2006.01) | |
| *B60W 10/11* | (2012.01) | |
| *F16H 59/10* | (2006.01) | |

(52) U.S. Cl.
CPC .......... *B60W 30/19* (2013.01); *B60W 10/06* (2013.01); *B60W 10/11* (2013.01); *F16H 3/091* (2013.01); *F16H 59/105* (2013.01); *B60W 2510/1005* (2013.01); *B60W 2510/1015* (2013.01); *B60W 2520/10* (2013.01); *B60W 2540/16* (2013.01)

(58) Field of Classification Search
CPC ...... B60W 30/19; B60W 10/06; B60W 10/11; B60W 2510/1005; B60W 2510/1015; B60W 2520/10; B60W 2540/16; F16H 3/091
See application file for complete search history.

(56) References Cited

U.S. PATENT DOCUMENTS

| | | | | |
|---|---|---|---|---|
| 4,631,679 | A * | 12/1986 | Klatt ..................... | F16H 59/044 477/121 |
| 4,776,239 | A * | 10/1988 | Sassi ..................... | B60W 10/02 477/119 |
| 5,239,894 | A * | 8/1993 | Oikawa ................. | B60W 10/06 123/399 |
| 5,741,202 | A * | 4/1998 | Huber ................... | B60W 10/06 477/110 |
| 6,019,698 | A * | 2/2000 | Lawrie .................... | B60K 6/48 477/5 |
| 7,810,601 | B2 | 10/2010 | Hamrin et al. | |

(Continued)

FOREIGN PATENT DOCUMENTS

JP    2009180342 A  *  8/2009  ............ F16H 61/28

*Primary Examiner* — Tisha D Lewis
(74) *Attorney, Agent, or Firm* — Wenderoth, Lind & Ponack, L.L.P.

(57) ABSTRACT

A shift switching mechanism of a utility vehicle includes: an input gear connected to an input shaft to which a driving force of an engine is input; a shifter that is connected to a counter shaft transmitting a driving force of the input shaft, and enables engagement between the input gear and a gear connected to the counter shaft; and a control unit that controls the shift switching mechanism. At reception of a shift command, the control unit calculates a rotation difference between the input gear and the shifter, and controls output of the engine to reduce the rotation difference.

7 Claims, 9 Drawing Sheets

(56) References Cited

U.S. PATENT DOCUMENTS

2002/0033071 A1\* 3/2002 Kobayashi ............ B60W 30/18
  74/730.1
2018/0126996 A1\* 5/2018 Park .................... B60W 10/113
2018/0148065 A1\* 5/2018 Jacoby .................... B60K 6/36

\* cited by examiner

SHIFT SWITCHING MECHANISM OF UTILITY VEHICLE

BACKGROUND OF THE INVENTION

Field of the Invention

The present invention relates to a shift switching mechanism of a utility vehicle.

Description of the Related Art

Conventionally, as disclosed in the description of U.S. Pat. No. 7,810,601, a utility vehicle changes gears by using a shift switching mechanism to achieve speed change.

SUMMARY OF THE INVENTION

It is generally recommended that speed change of a utility vehicle be carried out during a stop of the utility vehicle to smoothly switch gears.

Accordingly, it is an object of the present invention to provide a shift switching mechanism of a utility vehicle capable of achieving speed change even during running of the utility vehicle.

For achieving the above object, a shift switching mechanism of a utility vehicle according to the present invention includes: an input gear connected to an input shaft to which a driving force of an engine is input; a shifter that is connected to a counter shaft transmitting a driving force of the input shaft, and enables engagement between the input gear and a gear connected to the counter shaft; and a control unit (controller) that controls the shift switching mechanism. At reception of a shift command, the control unit calculates a rotation difference between the input gear and the shifter, and controls output of the engine to reduce the rotation difference.

According to the above configuration, when receiving the shift command, the control unit controls the output of the engine to reduce the rotation difference between the input gear and the shifter. Accordingly, engagement between the input gear and the shifter can be easily achieved.

It is preferable that the present invention further has following configurations.

(1) The control unit detects rotation of the input gear by using an input side rotation sensor provided on the input shaft, and detects rotation of the shifter by using a vehicle speed sensor.

(2) A lever detection switch that detects an initial operation of a shift lever that issues a shift command is further provided. The control unit controls the output of the engine based on detection by the lever detection switch.

(3) A phase detection sensor that detects a rotation phase of a shift drum that rotationally moves a shift fork that moves the shifter into engagement with the input gear is further provided. The control unit controls the output of the engine based on detection by the phase detection sensor.

(4) A position detection switch that detects completion of movement of the shift fork caused by shift change is further provided. The control unit ends the control of the output of the engine based on detection by the position detection switch.

(5) The control unit ends the control of the output of the engine when the rotation difference between the input gear and the shifter is equal to or smaller than a fixed value for a fixed time.

(6) The control unit instantaneously increases or decreases the output of the engine for disconnection between the input gear and the shifter.

According to the configuration (1), the rotation difference between the input gear and the shifter can be easily calculated by using the input side rotation sensor and the vehicle speed sensor.

According to the configuration (2), the control unit controls the output of the engine based on detection by the lever detection switch which detects an initial operation of the shift lever. Accordingly, the control unit can start output control of the engine in an early stage to reduce the rotation difference between the input gear and the shifter.

According to the configuration (3), the control unit detects an initial operation of the shift lever based on the rotation state of the shift drum by using the phase detection sensor to control output of the engine. Accordingly, the control unit can start output control of the engine in an early stage to reduce the rotation difference between the input gear and the shifter.

According to the configuration (4), shift completion is detected based on completion of movement of the shift fork, and the output control of the engine is ended based on the shift completion. Accordingly, the output control of the engine is allowed to end in an early stage after the shift completion.

According to the configuration (5), the shift completion is recognized, and the output control of the engine is ended without a switch for detecting completion of the movement of the shift fork.

According to the configuration (6), the control unit instantaneously increases or decreases the output of the engine, and thereby causes oscillation of the vehicle body and produces an instant for releasing torque to facilitate disconnection between the input gear and the shifter.

In short, according to the present invention, a shift switching mechanism of a utility vehicle capable of performing speed change even during running of the utility vehicle is provided.

DETAILED DESCRIPTION OF THE PREFERRED EMBODIMENTS

A utility vehicle including a shift switching mechanism according to an embodiment of the present invention will be hereinafter described with reference to the accompanying drawings. Utility vehicles are vehicles chiefly for traveling not only on grasslands, gravels, and sandy areas, but also on off-road such as unpaved mountain paths and forest roads, muds and rocky areas. For convenience of explanation, it is assumed in following description that a traveling direction of the utility vehicle corresponds to a "front" of the utility vehicle and respective components, and that left and right in a vehicle width direction as viewed from an occupant facing the front on the utility vehicle correspond to "left and right" of the utility vehicle and respective components.

[General Structure of Vehicle]

Figure 1:
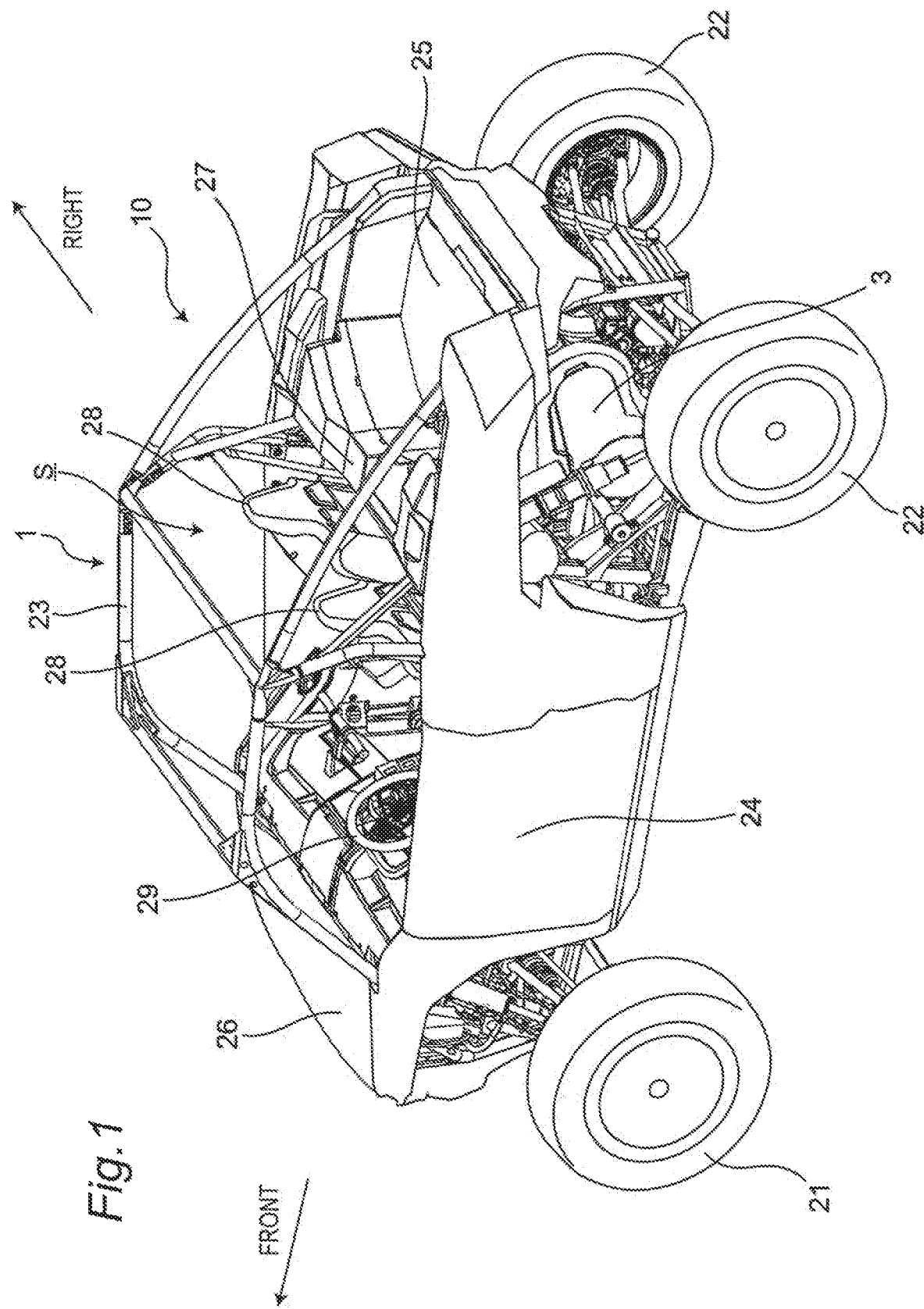
FIG. 1 is a perspective view of a utility vehicle including a shift switching mechanism according to an embodiment of the present invention.
Figure 2:
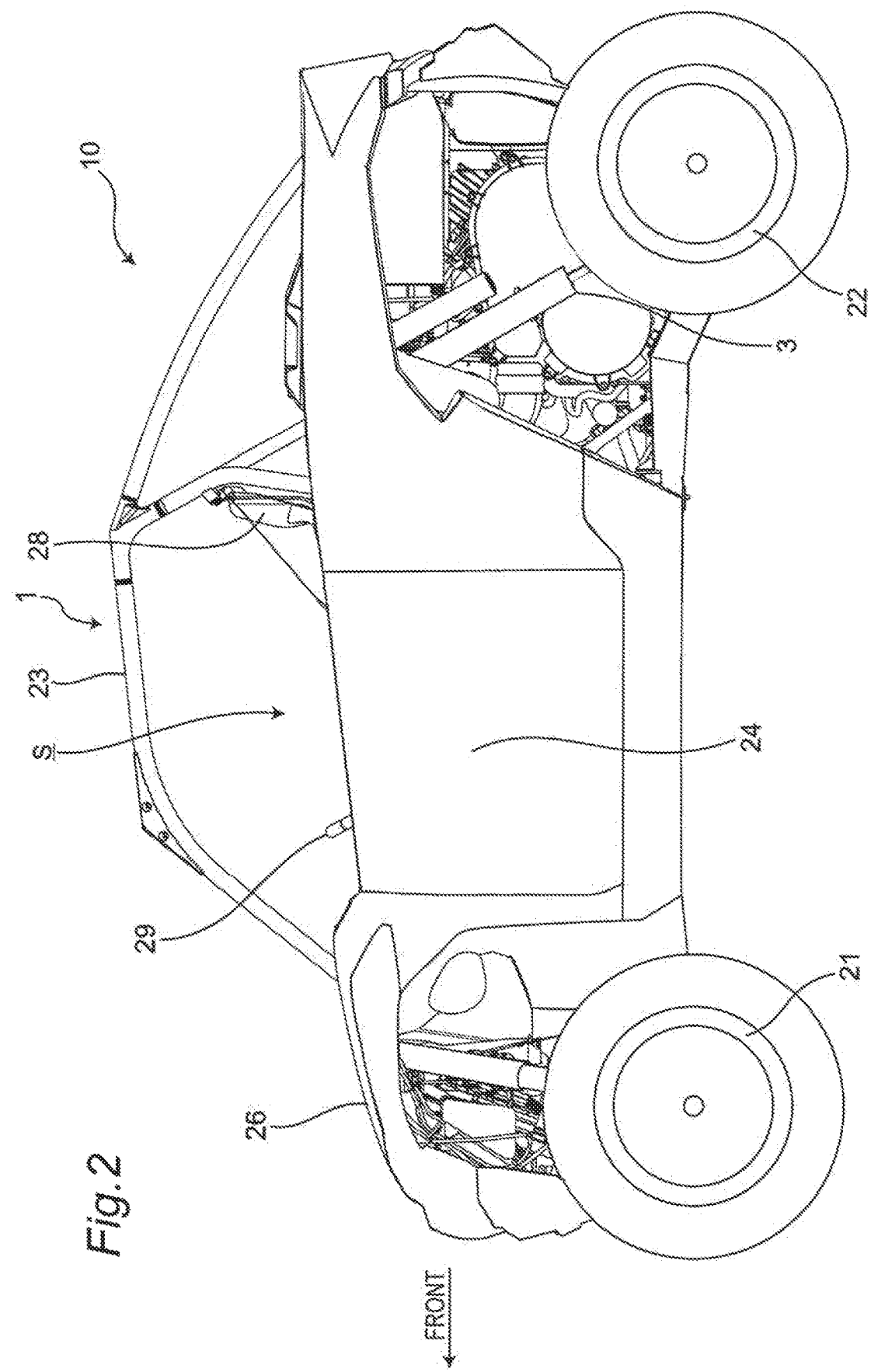
FIG. 2 is a left side view of the utility vehicle in FIG. 1.

FIG. 1 is a perspective view of a utility vehicle including a shift switching mechanism according to an embodiment of the present invention, while FIG. 2 is a left side view of the utility vehicle in FIG. 1.

As shown in FIGS. 1 and 2, a utility vehicle 10 includes a pair of left and right front wheels 21 in a front region of a vehicle body, a pair of left and right rear wheels 22 in a rear region of the vehicle body, and a boarding space (cabin) S between the front wheels 21 and the rear wheels 22. The boarding space S is surrounded by a ROPS 23 and a pair of left and right doors 24. The ROPS is an abbreviation of a rollover protective structure, and constitutes a part of a body frame 1.

A cargo bed 25 is provided behind the boarding space S, while a bonnet 26 is provided in front of the boarding space S. A back panel 27 which separates the cargo bed 25 from the boarding space S is further provided at a front end of the cargo bed 25.

A pair of left and right independent seats 28 are disposed in the boarding space S. An operation unit such as a steering wheel 29 is provided in front of the seat 28.

Figure 3:
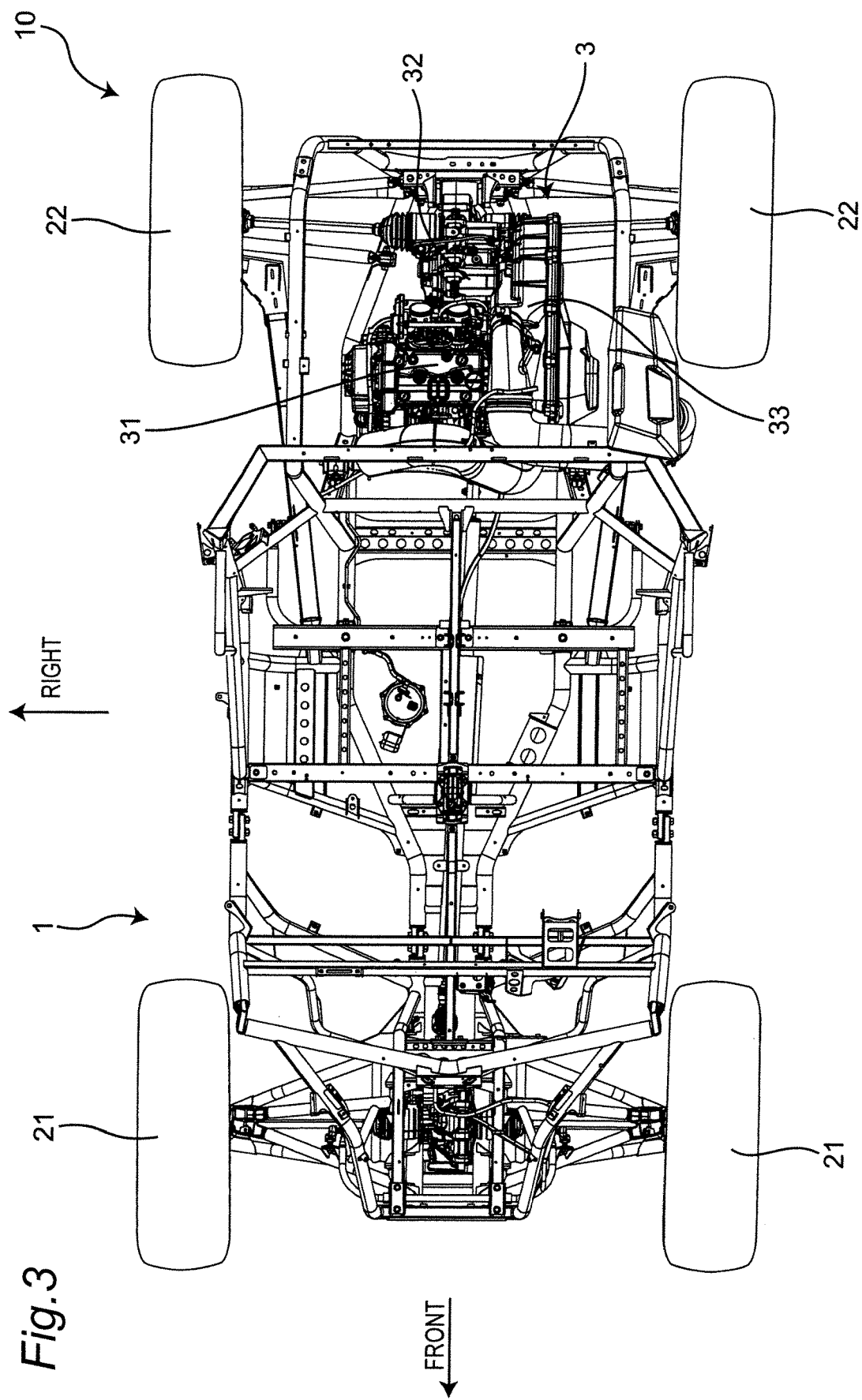
FIG. 3 is a top view showing an arrangement of a power unit.
Figure 4:
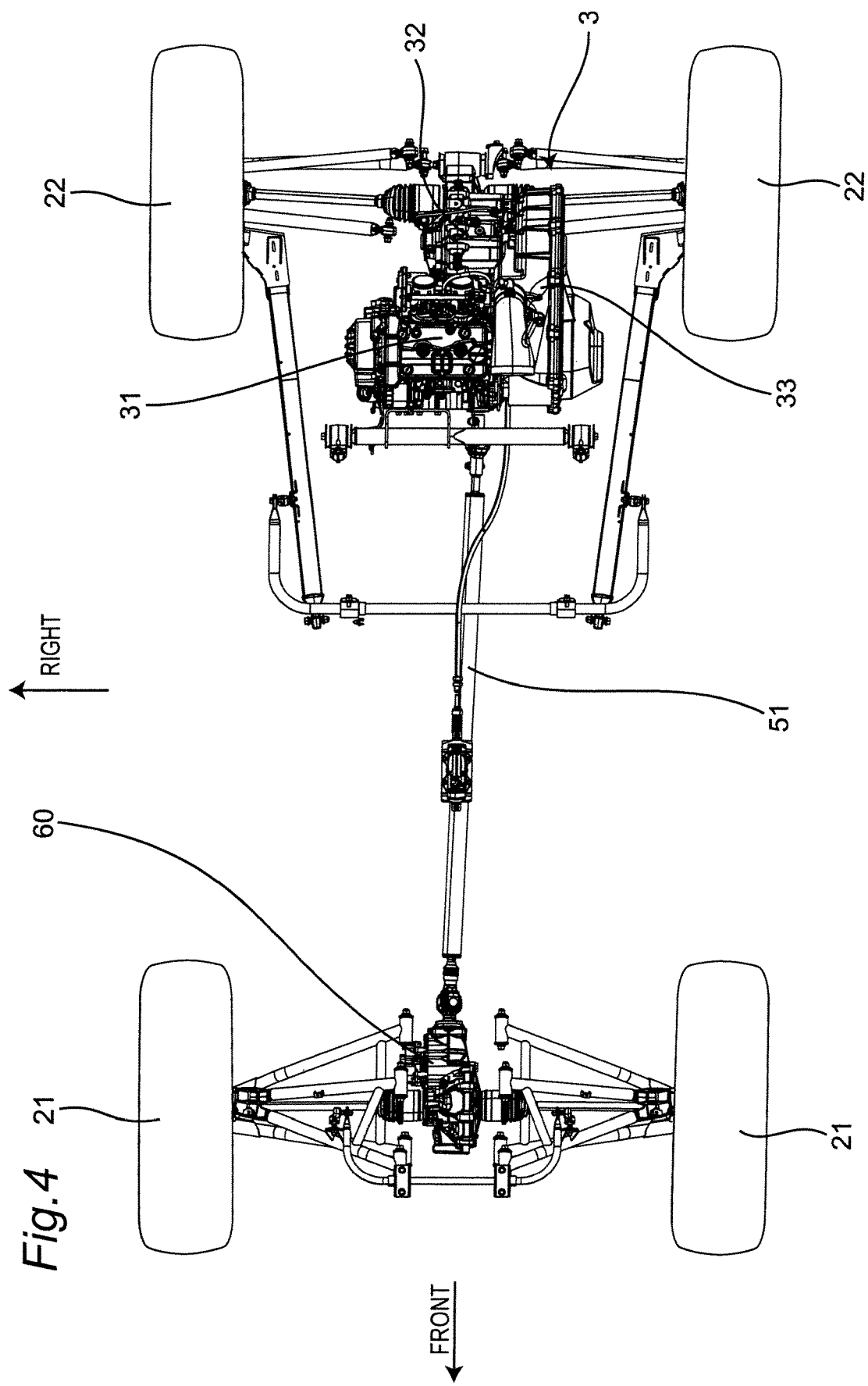
FIG. 4 is a top view showing a driving force transmission path of the power unit.
Figure 5:
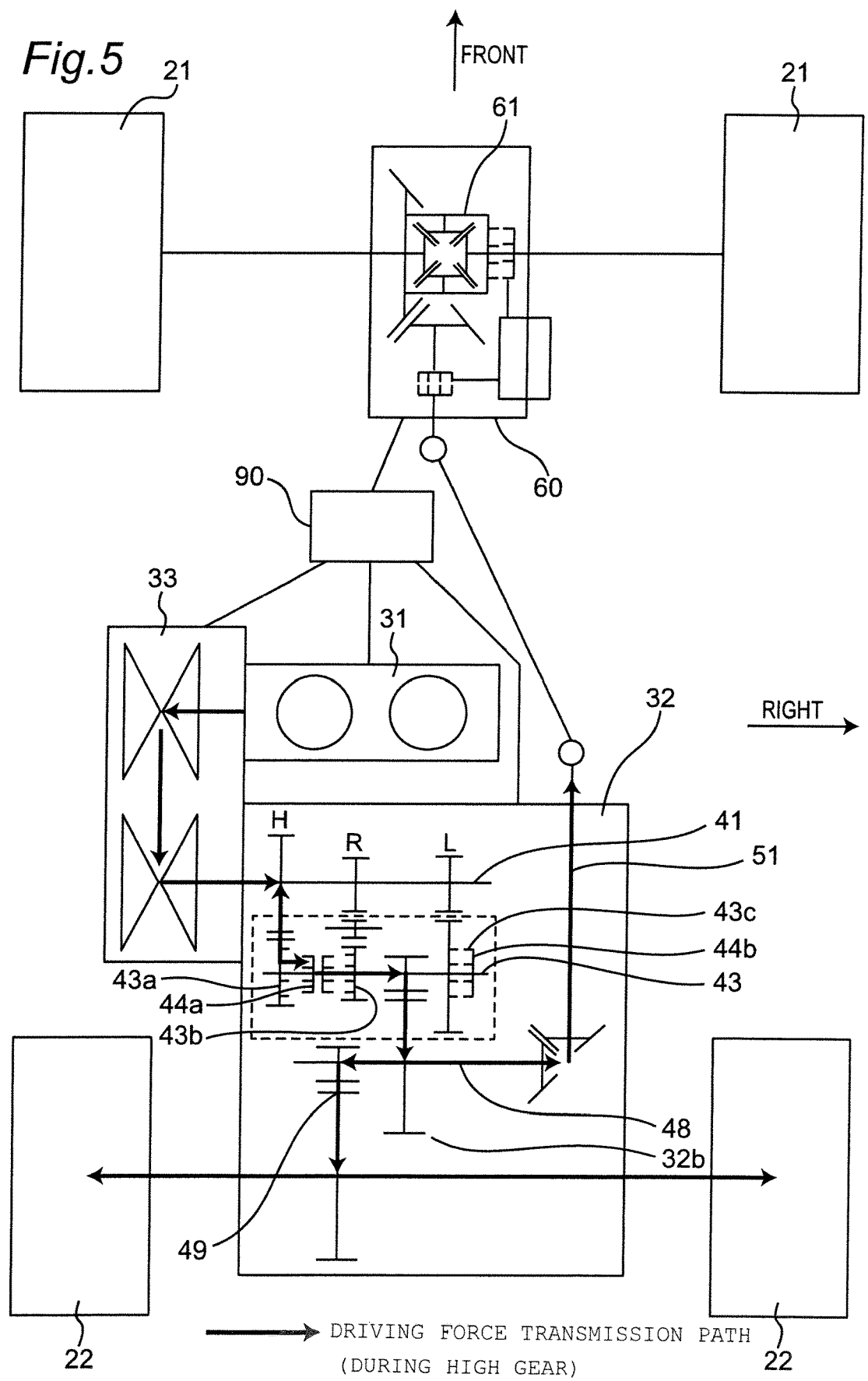
FIG. 5 is a schematic diagram describing the driving force transmission path of the power unit.

A power unit 3 is provided below the cargo bed 25. FIG. 3 is a top view showing an arrangement of the power unit 3, while FIG. 4 is a top view showing a driving force transmission path of the power unit 3. FIG. 5 is a schematic diagram describing the driving force transmission path of the power unit 3. As shown in FIGS. 3 to 5, the power unit 3 includes an engine 31, a transmission 32 disposed behind the engine 31, a V-belt type continuously variable transmission 33 disposed on the left side of the engine 31 and the transmission 32. A driving force of the engine 31 is transmitted to the transmission 32 via the continuously variable transmission 33. The transmission 32 transmits the driving force to the pair of left and right front wheels 21 and the pair of left and right rear wheels 22. The utility vehicle 10 further includes a control unit (controller) 90 for controlling each of devices provided in the driving force transmission path.

[Transmission]

Figure 6:
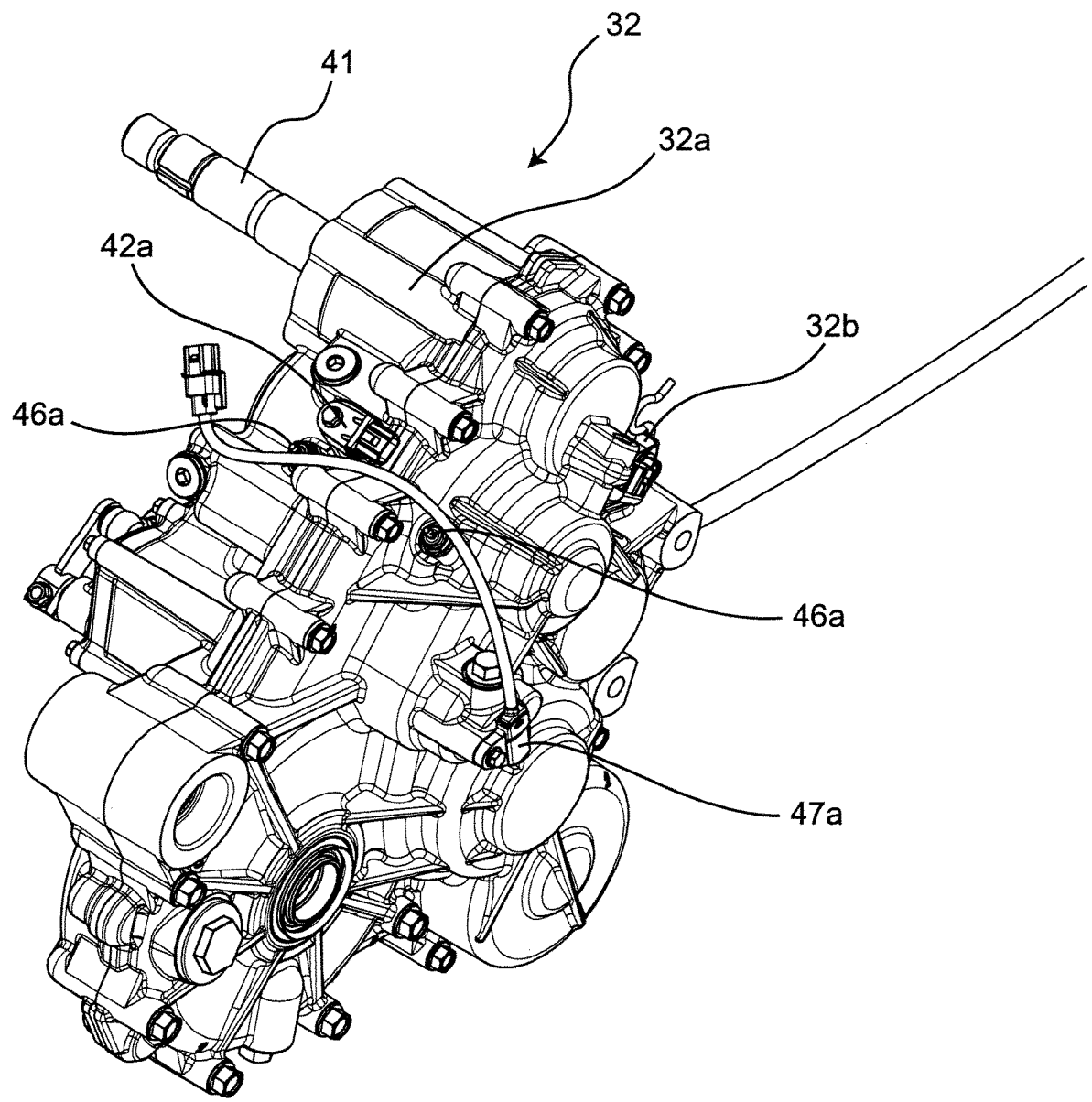
FIG. 6 is a perspective view of a transmission.
Figure 7:
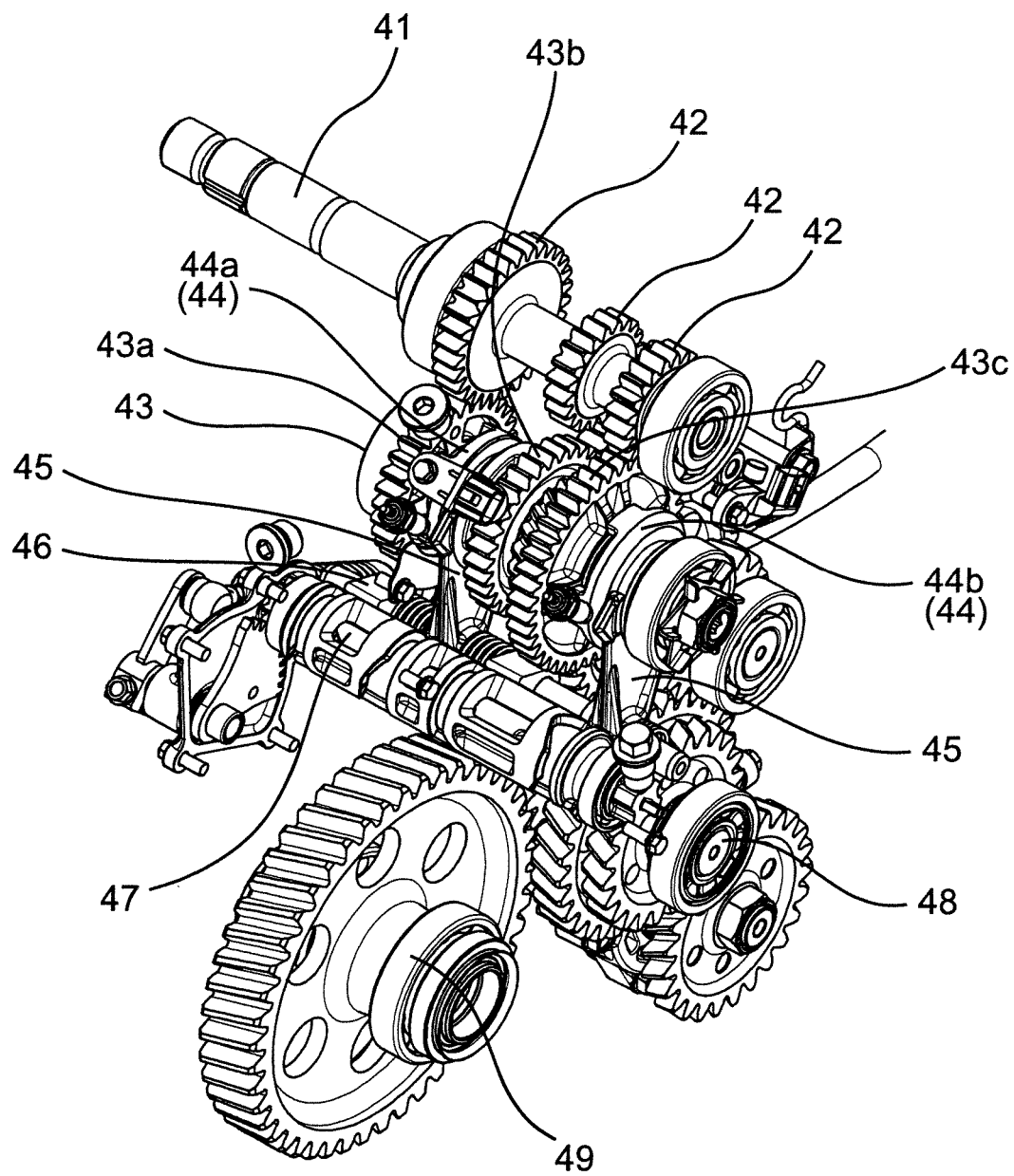
FIG. 7 is a perspective view of the transmission from which a transmission cover has been removed.
Figure 8:
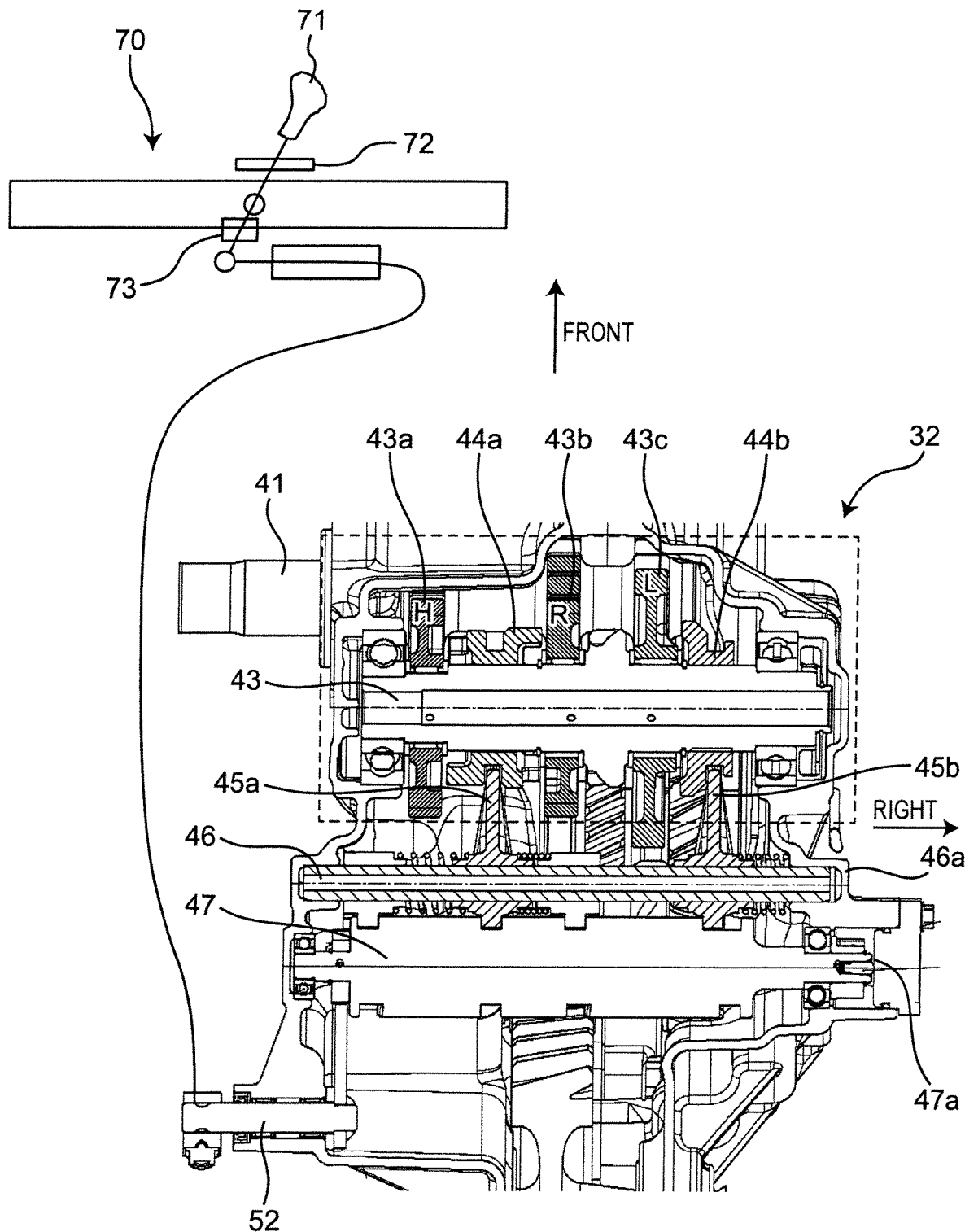
FIG. 8 is a schematic diagram showing a driving force transmission path in the transmission.

FIG. 6 is a perspective view of the transmission 32, while FIG. 7 is a perspective view of the transmission 32 from which a transmission cover 32a has been removed. FIG. 8 is a schematic diagram showing a driving force transmission path in the transmission 32. As shown in FIGS. 6 to 8, the transmission 32 includes an input shaft 41 to which the driving force from the continuously variable transmission 33 is input, an input gear 42 connected to the input shaft 41, a counter shaft 43, a shifter 44 connected to the counter shaft 43 that transmits the driving force of the input shaft 41, and enabling engagement between the input gear 42 and gears 43a, 43b, and 43c connected to the counter shaft 43, a shift shaft 46 receiving attachment of a shift fork 45 which moves the shifter 44 to achieve engagement between the input gear 42 and the gears 43a, 43b, 43c connected to the counter shaft 43, a shift drum 47 which rotationally moves the shift fork 45, a front wheel output shaft 48 to which a driving force of the counter shaft 43 is transmitted, and a rear wheel final reduction device 49 to which a driving force is transmitted from the front wheel output shaft 48. Connection includes not only direct connection, but also indirect connection via other components. An input side rotation sensor 42a which detects a rotation speed of the input gear 42 is provided on the transmission cover 32a near the input shaft 41. The driving force transmitted to the rear wheel final reduction device 49 is directly transmitted to the left and right rear wheels 22, or distributed and transmitted to the left and right rear wheels 22 by using a differential device.

The shifter 44 includes a first shifter 44a engaging with a high gear 43a or a reverse gear 43b of the counter shaft 43 engaging with the input gear 42, and a second shifter 44b engaging with a low gear 43c of the counter shaft 43. The shift fork 45 includes a first shift fork 45a engaging with the first shifter 44a, and a second shift fork 45b engaging with the second shifter 44b. A vehicle speed sensor 32b is provided on the transmission cover 32a to detect a vehicle speed for the gear connected to the front wheel output shaft 48. The rotation speed of the shifter 44 is calculated by the vehicle speed sensor 32b.

With a predetermined rotation of the shift drum 47, the first shift fork 45a moves in the axial direction, and the first shifter 44a engaging with the first shift fork 45a simultaneously moves in the axial direction. When the first shifter 44a moves to the left and brings a left end of the first shifter 44a and the high gear 43a into engagement, the rotation of the high gear 43a is transmitted to the counter shaft 43 via the first shifter 44a. When the first shifter 44a moves to the right and brings a right end of the first shifter 44a and the reverse gear 43b into engagement, a rotation of the reverse gear 43b is transmitted to the counter shaft 43 via the first shifter 44a. Moreover, with a predetermined rotation of the shift drum 47, the second shift fork 45b moves in the axial direction, and the second shifter 44b engaging with the second shift fork 45b simultaneously moves in the axial direction. When the second shifter 44b moves to the left and brings a left end of the second shifter 44b and the low gear 43c into engagement, the rotation of the low gear 43c is transmitted to the counter shaft 43 via the second shifter 44b. The driving force transmitted from the high gear 43a, the reverse gear 43b or the low gear 43c to the counter shaft 43 is transmitted to the rear wheels 22 via the rear wheel final reduction device 49, and to the front wheels 21 via the front wheel output shaft 48. FIG. 5 shows a path through which the driving force of the input gear 42 is transmitted to the rear wheels 22, or the rear wheels 22 and the front wheels 21 via the high gear 43a of the counter shaft 43.

A phase detection sensor 47a which detects a rotational phase of the shift drum 47 is attached to the transmission cover 32a near the shift drum 47. A position detection switch 46a which detects movement of the shift fork 45 to a position of engagement between the shifter 44 and the input gear 42, that is, completion of movement of the shift fork 45, is attached to the transmission cover 32a near the shift shaft 46.

A front wheel propeller shaft 51 extending toward the front is connected to a right end of the front wheel output shaft 48, while a front wheel final reduction device 60 is connected to a front end of the front wheel propeller shaft 51. A driving force of the front wheel output shaft 48 is transmitted to the front wheel final reduction device 60 via the front wheel propeller shaft 51. The driving force transmitted to the front wheel final reduction device 60 is distributed and transmitted to the left and right front wheels 21 by a differential device 61.

[Shift Lever Device]

As shown in FIG. 8, a shift lever device 70 is provided in a console box on the right side of a driver's seat and between the driver's seat and an assistant driver's seat, and connected to a drum rotation member 52 for rotating the shift drum 47. The shift lever device 70 includes a shift lever 71 and a shift panel 72.

Figure 9:
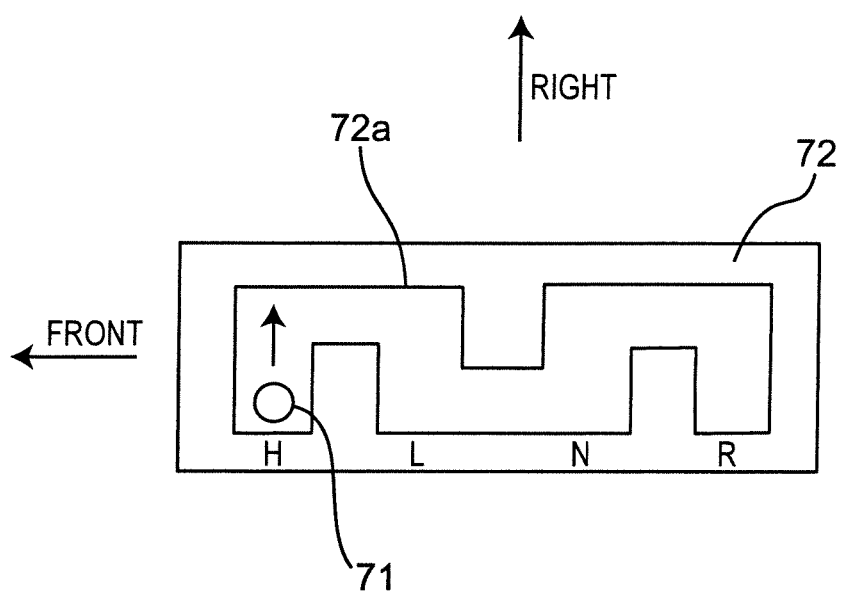
FIG. 9 is a top view of a shift panel.

FIG. 9 is a top view of the shift panel 72. The shift lever 71 moves along a shift gate 72a formed in the shift panel 72 to rotate the shift drum 47 via the drum rotation member 52, and achieve switching to one of four shift positions. The four shift positions are located in the order of a forward high speed position (H), a forward low speed position (L), a neutral position (N), and a reverse position (R) from the front to the rear. The shape of the shift gate 72a requires initial movement of the shift lever 71 toward the right, and subsequent movement of the shift lever 71 in the front-rear direction to shift from H to L, from L to H, from N to R, and from R to N.

The shift lever device 70 includes a lever detection switch 73 which detects an operation for moving the shift lever 71 to the right at the time of switching of a shift position, that is, detecting an initial operation of the shift lever 71.

The shift switching mechanism of the utility vehicle operates in a following manner.

When receiving a shift command from the driver, the control unit 90 calculates a rotation difference between rotation of the input gear 42 detected by the input side rotation sensor 42a and rotation of the shifter 44 detected by the vehicle speed sensor 32b, and controls an output of the engine 31 to reduce the rotation difference. More specifically, when the rotation speed of the input gear 42 is higher than the rotation speed of the shifter 44, the output of the engine 31 is reduced to reduce the rotation speed of the input gear 42 to a value closer to the rotation speed of the shifter 44.

The control unit 90 herein issues a shift command of the driver based on detection of the lever detection switch 73, and controls the output of the engine 31 in accordance with the operation of the lever detection switch 73.

Alternatively, the control unit 90 may issue a shift command of the driver based on detection by the phase detection sensor 47a. In this case, the control unit 90 may detect the rotation of the shift drum 47 using the phase detection sensor 47a, and control the output of the engine 31.

After controlling the output of the engine 31, the control unit 90 detects completion of the movement of the shift fork 45 by using the position detection switch 46a, recognizes completion of engagement between the input gear and the shifter based on the completion of the movement of the shift fork 45, and ends the control of the output of the engine.

When the rotation difference between the rotation of the input gear 42 detected by the input side rotation sensor 42a and the rotation of the shifter 44 detected by the vehicle speed sensor 32b is kept equal to or smaller than a fixed value for a fixed time, the control unit 90 may end the output control of the engine 31 without using the position detection switch 46a.

In addition, when the rotation speed of the engine 31 or the vehicle speed exceeds a fixed value in the state that the control unit 90 issues a shift command of the driver based on detection by the lever detection switch 73, an alarm may be given to the driver, for example, by generating an alarm sound or blinking a meter to warn the driver that issue of the shift command is not preferable.

According to the shift switching mechanism having the above configuration, following effects can be offered.

(1) When receiving the shift command, the control unit 90 controls the output of the engine 31 to reduce the rotation difference between the input gear 42 and the shifter 44. Accordingly, engagement between the input gear 42 and the shifter 44 can be easily achieved.

(2) The rotation of the input gear 42 is detected by the input side rotation sensor 42a, while the rotation of the shifter 44 is detected by the vehicle speed sensor 32b. Accordingly, the control unit 90 can easily calculate the rotation difference between the input gear 42 and the shifter 44 by using the input side rotation sensor 42a and the vehicle speed sensor 32b.

(3) The control unit 90 controls the output of the engine 31 based on detection by the lever detection switch 73 which detects an initial operation of the shift lever 71. Accordingly, the control unit 90 can start the output control of the engine 31 in an early stage to reduce the rotation difference between the input gear 42 and the shifter 44.

(4) The control unit 90 detects an initial operation of the shift lever 71 based on the rotation state of the shift drum 47 by using the phase detection sensor 47a to control the output of the engine 31. Accordingly, the control unit 90 can start the output control of the engine 31 in an early stage to reduce the rotation difference between the input gear 42 and the shifter 44.

(5) The control unit 90 detects shift completion based on completion of movement of the shift fork 45, and ends the output control of the engine 31. Accordingly, the output control of the engine 31 is allowed to end in an early stage after shift completion.

(6) When the rotation difference between the input gear 42 and the shifter 44 is equal to or smaller than a fixed value for a fixed period, the control unit 90 ends the output control of the engine 31. Accordingly, the control unit 90 can determine shift completion and end the output control of the engine 31 without using a switch which detects completion of movement of the shift fork 45.

In the above embodiment, the vehicle speed sensor 32b is provided on the gear connected to the front wheel output shaft 48. However, the vehicle speed sensor 32b may be provided on a gear that rotates at the same speed as the speed of the counter shaft 43, or may be provided on the rear wheel final reduction device 49 or the front wheel final reduction device 60. The vehicle speed sensor 32b may be of any types as long as a rotation speed of a target can be detected for calculation of a vehicle speed. In the present embodiment, for example, the vehicle speed sensor 32b may be a sensor which detects a rotation speed of the counter shaft 43 or of a rotation shaft on the downstream side of the counter shaft 43 in the driving force transmission direction, or may be a sensor which detects a rotation speed of the front wheel output shaft 48. When the front wheel final reduction device 60 has a differential lock mechanism, the vehicle speed sensor provided on the front wheel final reduction device 60 is disposed on a ring gear or on a shifter (shift sleeve) of the differential lock mechanism.

When the input gear 42 and the shifter 44 are disconnected, the control unit 90 may instantaneously increase or decrease the output of the engine 31, and thereby cause oscillation of the vehicle body and produce an instant for releasing torque to facilitate disconnection between the input gear 42 and the shifter 44.

In the above embodiment, the control unit 90 controls the output of the engine 31 to reduce a rotation difference between the input gear 42 and the shifter 44 when receiving a shift command. However, when the rotation speed of the input shaft 41 of the transmission 32 or the vehicle speed exceeds a predetermined value, a warning may be displayed to prohibit operation of the shift lever.

Various modifications and changes can be made without departing from the spirit and scope of the present invention described in the appended claims.

What is claimed is:

1. A shift switching mechanism of a utility vehicle, the shift switching mechanism comprising:
    an input gear connected to an input shaft to which a driving force of an engine is input;
    a shifter connected to a counter shaft transmitting a driving force of the input shaft, the shifter being configured to enable engagement between the input gear and a gear connected to the counter shaft; and
    a controller configured to control the shift switching mechanism,
    wherein the controller is further configured to, upon receiving a shift command, calculate a rotation difference between the input gear and the shifter, and to control an output of the engine to reduce the rotation difference, and
    wherein the controller is configured to end the control of the output of the engine when the rotation difference between the input gear and the shifter is equal to or smaller than a fixed value for a fixed amount of time.

2. The shift switching mechanism according to claim 1, wherein the controller is further configured to detect rotation of the input gear by using an input side rotation sensor provided on the input shaft, and to detect rotation of the shifter by using a vehicle speed sensor.

3. The shift switching mechanism according to claim 1, further comprising a lever detection switch configured to detect an initial operation of a shift lever configured to issue a shift command, wherein the controller is further configured to control the output of the engine based on detection of the initial operation by the lever detection switch.

4. The shift switching mechanism according to claim 1, further comprising a phase detection sensor configured to detect a rotation phase of a shift drum, the shift drum being configured to rotationally move a shift fork so as to move the shifter into engagement with the input gear, wherein the controller is configured to control the output of the engine based on detection by the phase detection sensor.

5. The shift switching mechanism according to claim 1, further comprising a shift fork configured to move the shifter into engagement with the input gear, and a position detection switch configured to detect a completion of movement of the shift fork caused by shift change, wherein the controller is further configured to end the control of the output of the engine based on detection by the position detection switch.

6. The shift switching mechanism according to claim 1, wherein the controller is configured to instantaneously increase or decrease the output of the engine for disconnection between the input gear and the shifter.

7. The shift switching mechanism according to claim 1, further comprising a shift lever configured to issue a shift command, wherein the controller is configured to issue an alarm to prohibit operation of the shift lever when rotation speed of the engine or a vehicle speed exceeds a predetermined value.

* * * * *